United States Patent
Teshima et al.

(10) Patent No.: US 9,859,540 B2
(45) Date of Patent: *Jan. 2, 2018

(54) SEPARATOR AND NONAQUEOUS ELECTROLYTE BATTERY

(71) Applicant: Sony Corporation, Tokyo (JP)

(72) Inventors: Yukako Teshima, Fukuoka (JP); Atsushi Kajita, Fukushima (JP); Kensuke Yamamoto, Fukushima (JP); Masatake Hayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/725,705

(22) Filed: May 29, 2015

(65) Prior Publication Data

US 2015/0263321 A1    Sep. 17, 2015

Related U.S. Application Data

(63) Continuation of application No. 12/985,826, filed on Jan. 6, 2011.

(30) Foreign Application Priority Data

Jan. 13, 2010    (JP) ................. P2010-004472

(51) Int. Cl.
*H01M 2/16* (2006.01)
*H01M 4/1395* (2010.01)
(Continued)

(52) U.S. Cl.
CPC ......... *H01M 2/166* (2013.01); *H01M 2/1686* (2013.01); *H01M 4/1395* (2013.01);
(Continued)

(58) Field of Classification Search
CPC .... H01M 2/164; H01M 2/1646; H01M 2/166; H01M 10/05; H01M 2/1686; H01M 4/1395; H01M 4/581; H01M 4/625
See application file for complete search history.

(56) References Cited

U.S. PATENT DOCUMENTS 4,335,193 A    6/1982    Doi et al.
5,049,275 A    9/1991    Gillberg-LaForce et al.
(Continued)

FOREIGN PATENT DOCUMENTS

CN    101069302    11/2007
CN    101331643    12/2008
(Continued)

OTHER PUBLICATIONS

English Machine Translation of Nakajima JP2004-273437, Sep. 2004.*

(Continued)

*Primary Examiner* — Ula C Ruddock
*Assistant Examiner* — Lisa S Park
(74) *Attorney, Agent, or Firm* — K&L Gates LLP

(57) ABSTRACT

A separator is provided and includes a functional resin layer containing a resin material and an inorganic oxide filler, having a porous interconnected structure in which many pores are mutually interconnected and having a contact angle against an electrolytic solution of not more than 11 degrees.

10 Claims, 3 Drawing Sheets

(51) Int. Cl.
*H01M 4/58* (2010.01)
*H01M 4/62* (2006.01)
*H01M 10/05* (2010.01)

(52) U.S. Cl.
CPC .......... *H01M 4/581* (2013.01); *H01M 4/625* (2013.01); *H01M 10/05* (2013.01)

(56) References Cited

U.S. PATENT DOCUMENTS

| | | | | |
|---|---|---|---|---|
| 5,437,940 | A * | 8/1995 | Hilston | H01M 4/581 29/2 |
| 6,627,346 | B1 * | 9/2003 | Kinouchi | H01M 2/166 429/144 |
| 7,807,286 | B2 * | 10/2010 | Hennige | D06M 11/45 428/113 |
| 8,231,999 | B2 * | 7/2012 | Teshima | H01M 2/1653 429/145 |
| 2005/0208383 | A1 * | 9/2005 | Totsuka | H01M 2/162 429/247 |
| 2005/0221165 | A1 * | 10/2005 | Hennige | C08J 7/06 429/62 |
| 2006/0008700 | A1 | 1/2006 | Yong et al. | |
| 2007/0072069 | A1 * | 3/2007 | Yamada | B01D 69/02 429/145 |
| 2007/0178384 | A1 * | 8/2007 | Kajita | H01M 2/1653 429/251 |
| 2007/0264577 | A1 | 11/2007 | Katayama et al. | |
| 2007/0298322 | A1 * | 12/2007 | Yamamoto | H01M 4/628 429/218.1 |
| 2008/0070107 | A1 * | 3/2008 | Kasamatsu | H01M 2/164 429/144 |
| 2008/0070120 | A1 * | 3/2008 | Miyawaki | H01M 4/134 429/231.95 |
| 2008/0160412 | A1 * | 7/2008 | Kasamatsu | H01M 2/1653 429/223 |
| 2009/0067119 | A1 | 3/2009 | Katayama et al. | |
| 2009/0325074 | A1 * | 12/2009 | Fukumoto | H01M 2/166 429/231.95 |

FOREIGN PATENT DOCUMENTS

| | | |
|---|---|---|
| JP | 2003-022843 | 1/2003 |
| JP | 2004-273437 | 9/2004 |
| JP | 2005-235695 | 9/2005 |
| JP | 2008-027634 | 2/2008 |
| JP | 2008-188777 | 8/2008 |
| JP | 2008-240068 | 10/2008 |
| JP | 2008-243825 | 10/2008 |
| JP | 2009-066945 | 4/2009 |
| JP | 2009-212086 | 9/2009 |
| WO | 2008/044761 | 4/2008 |
| WO | 2008/114727 | 9/2008 |

OTHER PUBLICATIONS

Machine English translation of Zhang JP2001-319634.*
Japanese Office Action dated Sep. 9, 2014 in corresponding Japanese Application No. 2011005265.
Description of PVDF from porox.com, Oct. 1, 2011.
Chinese Office Action dated Jan. 28, 2014 in corresponding Chinese Patent Application No. 201110002330.0.
Japanese Office Action dated Nov. 10, 2015 in corresponding Japanese Application No. 2015037238.

* cited by examiner

SEPARATOR AND NONAQUEOUS ELECTROLYTE BATTERY

CROSS REFERENCES TO RELATED APPLICATIONS

The present application is a continuation of U.S. patent application Ser. No. 12/985,826, filed Jan. 6, 2011, which application claims priority to Japanese Patent Application 2010-004472 filed on Jan. 13, 2010, the entire contents of which is hereby incorporated by reference.

BACKGROUND

The present disclosure relates to a separator and a battery using the same. In more detail, the present invention relates to a separator insulating a positive electrode and a negative electrode from each other and a battery using the same.

In recent years, because of conspicuous development of portable electronic technologies, mobile phones and laptop personal computers have been recognized as a fundamental technology for supporting the highly computerized society. Research and development regarding high functionalization of these appliances are being energetically advanced, and it has been considered to be problematic that a driving time is shortened because of an increase of power consumption due to the high functionalization.

In order to ensure a driving time on a certain level or more, since it is an essential condition to realize a high energy density of a secondary battery to be used as a driving power source, for example, a lithium ion secondary battery is expected.

In studying realization of high capacity and high safety of the lithium ion secondary battery, when only a related-art polyolefin microporous film is used, it may be impossible to obtain a sufficient performance, and therefore, it is necessary to impart a function to the polyolefin microporous film. As a method of imparting a function to the polyolefin microporous film, there has been proposed, for example, a method of coating resins having different properties from each other on the polyolefin microporous film.

For example, Patent Document 1 (JP-A-2008-243825) discloses a separator composed of a porous film containing a porous substrate for separator prepared by integrally forming tabular particles by a binder resin and a resin having a melting point in the range of from 80 to 130° C. The tabular particles constituting the porous substrate for separator have a heat-resistant temperature of 150° C. or higher, at least a part thereof has heat resistance and electric insulating properties and is electrochemically stable, and a number average particle size of the tabular particles is 0.1 µm or more and not more than 15 µm.

In Patent Document 1, it is described that by using the foregoing separator as a separator for battery such as lithium secondary batteries, the deposition of a lithium dendrite is prevented from occurring due to the presence of an inorganic oxide filler.

Also, Patent Document 2 (JP-A-2008-27634) discloses a separator composed of a porous heat-resistant layer provided on each of the surfaces of a positive electrode plate and a negative electrode plate opposing to each other and a nonaqueous electrolyte, wherein a metal oxide having a particle size distribution at not more than 5.0 µm, a D10 in the particle size distribution measurement of from 0.2 to 0.6 µm and a mode diameter of from 0.80 to 1.25 µm is used as a filler of the porous heat-resistant layer.

In Patent Document 2, it is described that a lithium ion secondary battery having a porous heat-resistant layer is produced stably and in a large quantity.

SUMMARY

However, in order to obtain sufficient battery characteristics, it may be required to use a separator which is excellent in impregnating properties and liquid-holding properties of an electrolytic solution and which does not hinder the ion conductivity.

In Patent Document 1, it is described that the deposition of a lithium dendrite is prevented from occurring due to the presence of an inorganic oxide filler, thereby enhancing the stability. However, Patent Document 1 does not describe an issue of enhancing the battery performance or preventing a lowering of the battery characteristics.

Similarly, though Patent Document 2 describes an enhancement of the heat resistance, it does not describe an issue of enhancing the battery performance or preventing a lowering of the battery characteristics. Also, though Patent Document 2 describes an inorganic oxide, the embodiments thereof are exclusively limited to magnesium oxide, and other inorganic oxides are not mentioned.

Therefore, it is desirable to provide a separator from which sufficient impregnating properties of an electrolytic solution are obtained and which is able to enhance the separator performance and battery characteristics without hindering the ion conductivity and a battery using the same.

According to an embodiment, there is provided a separator including a functional resin layer containing a resin material and an inorganic oxide filler, having a porous interconnected structure in which many pores are mutually interconnected and having a contact angle against an electrolytic solution of not more than 11 degrees.

According to another embodiment, there is provided a nonaqueous electrolyte battery including a positive electrode, a negative electrode, an electrolyte and a separator, wherein the separator is composed of a functional resin layer containing a resin material and an inorganic oxide filler, having a porous interconnected structure in which many pores are mutually interconnected and having a contact angle against an electrolytic solution of not more than 11 degrees.

The contact angle referred to herein means a contact angle in the case of measurement under a condition ten seconds after dropping a droplet of the electrolytic solution on the separator surface. The electrolytic solution is a solution obtained by adding 1.1 moles/kg of lithium hexafluorophosphate ($LiPF_6$) as an electrolyte salt to a nonaqueous solvent of a mixture of ethylene carbonate (EC) and diethyl carbonate (DEC) in a volume ratio of 4/6.

A mean particle diameter mean particle diameter D50 of the inorganic oxide filler is preferably not more than 50% of a thickness of the functional resin layer. Also, it is preferable that the inorganic oxide filler has a mean particle diameter of 0.2 µm or more and not more than 5.0 µm and a specific surface area of 2.0 $m^2/g$ or more; and that when the mean particle diameter and the specific surface area of the inorganic oxide filler are defined as X [µm] and Y [$m^2/g$], respectively, a value obtained by multiplying X by Y falls within the range of $1 \leq (X \times Y) \leq 18$.

Also, it is preferable that the functional resin layer contains at least a heat-resistant resin; and it is more preferable that the functional resin layer contains at least a fluorocarbon based resin.

Also, the separator may be constituted such that it further includes a base material layer composed of a microporous film made of a polyolefin resin different from the resin material contained in the functional resin layer; and that a diameter of a narrowest portion of through-holes of the functional resin layer is larger than a diameter of a narrowest portion of through-holes of the base material layer.

Since the separator according to the embodiment contains an inorganic oxide filler and a resin material and has a porous interconnected structure in which many pores are mutually interconnected, it is excellent in impregnating properties and liquid-holding properties of an electrolytic solution and does not hinder the ion conductivity.

According to the embodiments, since the separator which is excellent in impregnating properties and liquid-holding properties of an electrolytic solution and which does not hinder the ion conductivity is used, it is able to enhance the battery characteristics.

Additional features and advantages are described herein, and will be apparent from the following Detailed Description and the figures.

DETAILED DESCRIPTION

Embodiments are hereunder described with reference to the accompanying drawings in the following order.
1. First embodiment (configuration of separator)
2. Second embodiment (example of cylindrical battery)
3. Third embodiment (example of flat battery)

1. First Embodiment

The separator according to a first embodiment is hereunder described.

(1-1) Configuration of Separator

Figure 1:
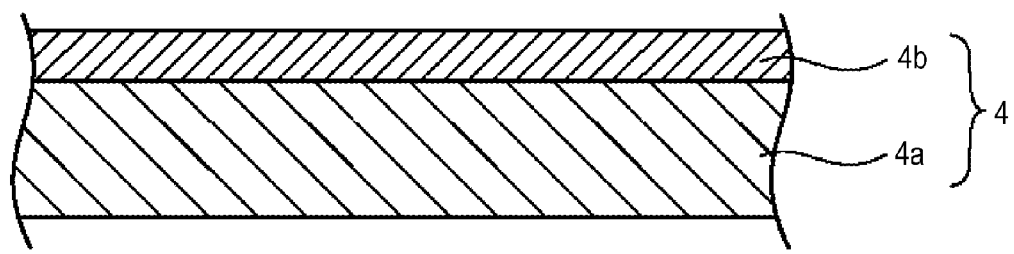
FIG. 1 is an enlarged sectional view of an example of a separator of a battery according to a first embodiment.

A separator 4 partitions a positive electrode and a negative electrode from each other and allows a lithium ion to pass therethrough while preventing a short circuit of current to be caused due to the contact between the both electrodes. As shown in FIG. 1, the separator 4 is constructed of a base material layer 4a and a functional resin layer 4b. The base material layer 4a may be provided as the need arises, and the separator 4 may be constructed of only the functional resin layer 4b.

[Base Material Layer]

The base material layer 4a is composed of a microporous film made of a polyolefin resin. Examples of the polyolefin resin which can be used include polyethylene (PE), polypropylene (PP) and a mixture of these polyolefin resins. The polyolefin resin has a shutdown function to clog open holes in the neighborhood of a melting point thereof, thereby shutting off a current.

A thickness of the base material layer 4a may be the same degree as that of a generally used separator, and for example, it is preferably 5 µm or more and not more than 20 µm.

[Functional Resin Layer]

The functional resin layer 4b is composed of a resin different from the inorganic oxide filler-containing polyolefin resin and has a porous interconnected structure in which many pores are mutually interconnected. In the functional resin layer 4b, in the case where a diameter of the narrowest portion of each of the functional resin layer 4b and the base material layer 4a is measured by a bubble point method, a half-drying method and a method according to the Darcy's law by using a perm porometer (CFP-1500A, manufactured by Seika Corporation) and a liquid extrusion porosimeter (LEP-200-A, manufactured by Seika Corporation), the diameter of the narrowest portion of through-holes of the functional resin layer 4b is larger than the diameter of the narrowest portion of through-holes of the functional base material layer 4a. The functional resin layer 4b having such a structure is excellent in impregnating properties and ion conductivity of an electrolytic solution.

When the diameter of the narrowest portion of through-holes of the functional resin layer 4b is smaller than that of the base material layer 4a, such a portion becomes a bottleneck for the ion conductivity, the ion conductivity is deteriorated as compared with that of a separator constructed of only a base material, and in particular, the battery characteristics such as a cycle characteristic are deteriorated. Therefore, the function as a separator is deteriorated. However, in the case where the diameter of the narrowest portion of through-holes of the functional resin layer 4b is larger than that of the base material, it is possible to reveal the function of the functional resin layer 4b without hindering the ion conductivity of the base material layer 4a. Therefore, it may be required that the diameter of the narrowest portion of through-holes of the functional resin layer 4b is larger than the diameter of the narrowest portion of through-holes of the base material layer 4a.

The functional resin layer 4b in the first embodiment according to the present invention has a low contact angle against an electrolytic solution, and for example, its contact angle against an electrolytic solution having a general constitution is preferably not more than 11 degrees. The contact angle against an electrolytic solution can be lowered by adding an inorganic oxide filler to the functional resin layer 4b.

In the functional resin layer 4b in the first embodiment according to the present invention, as primary factors in an enhancement of wettability against an electrolytic solution, there are exemplified the matter that an affinity itself between the added inorganic oxide particle and the electrolytic solution is high; and the matter that the impregnation of the electrolytic solution is promoted by a capillary phenomenon by voids existing in the functional resin layer 4b.

By making the contact angle against an electrolytic solution low, not only the impregnating properties of the electrolytic solution into the separator 4 are enhanced, but the liquid-holding properties of the separator 4 are enhanced. The contact angle between the separator 4 (the functional resin layer 4b provided on the surface of the separator 4) and the electrolytic solution is a portion expressed by θ in FIG. 2, and for example, it can be measured by an automated contact angle meter, manufactured by Kyowa Interface Science Co., Ltd., or the like. Also, the foregoing contact angle refers to a contact angle in the case of measurement under a condition ten seconds after dropping a droplet of the electrolytic solution on the surface of the separator 4. Here, the contact angle θ is, for example, determined by the θ/2 method. That is, in the case where an angle between a droplet base line and a line passing beyond an apex of the droplet is defined as θ', the contact angle θ=2θ' is formulated. According to this matter, the contact angle θ can be calculated by determining θ' using a distance $2r$ of the droplet base line and a height h of the droplet. At that time, it is necessary that the droplet is dropped in an amount to an extent that it is free from an influence of the gravity.

The electrolytic solution becomes a medium for the movement of a lithium ion. For that reason, in the case where the liquid-holding properties of the electrolytic solution are poor, deterioration of the cycle characteristic is caused. Also, in the case where a deviation of the presence of the electrolytic solution exists, in particular, ununiformity is caused in intercalation or deintercalation of lithium into or from the electrode active material following the charge/discharge, so that there is a concern that the deposition of a lithium metal dendrite due to the generation of a partial overvoltage, or the like occurs. Because of the deposition of a dendrite, a lowering of the stability in the inside of the battery or the deterioration of the cycle characteristic becomes remarkable. On the other hand, when the inorganic oxide filler particles exist in the separator, whereby the wettability against the electrolytic solution is enhanced, the distribution of the electrolytic solution becomes uniform. Therefore, the foregoing phenomenon is hardly caused.

Examples of the inorganic oxide filler which is used for the functional resin layer 4b include aluminum oxide ($Al_2O_3$), zirconium oxide ($ZrO_2$), titanium oxide ($TiO_2$), magnesium oxide (MgO), silicon dioxide ($SiO_2$), silicon carbide (SiC), aluminum nitride (AlN) and boron nitride (BN).

It is preferable that the inorganic oxide filler has a mean particle diameter of 0.2 μm or more and not more than 5.0 μm. When the mean particle diameter of the inorganic oxide filler is too small, there is a concern that the inorganic oxide filler is aggregated, so that the layer is not favorably formed at the time of forming the functional resin layer 4b. Also, there is a concern that secondary particles resulting from the aggregation of the inorganic oxide filler locally exist, thereby causing ununiformity.

On the other hand, when the mean particle diameter of the inorganic oxide filler exceeds 5.0 μm, there is a concern that a lowering of the capillary phenomenon to be caused due to voids formed by mixing of the inorganic oxide filler is caused, so that the wettability is lowered, or a deviation is caused in the wettability due to ununiformity of the voids. Also, there is a concern that the layer is not favorably formed at the time of forming the functional resin layer 4b. Also, similar to the case where the inorganic oxide filler is aggregated, there is a concern that secondary particles resulting from the aggregation of the inorganic oxide filler locally exist, thereby causing ununiformity.

That is, the functional resin layer 4b includes a step of coating a resin solution of a mixture of a resin material and an inorganic oxide filler, and in this coating step, there is a concern that a region where the resin solution does not spread depending upon the inorganic oxide filler having a large particle size is generated.

A mean particle diameter can be obtained by laser diffractometry method.

Also, it is preferable that the inorganic oxide filler has a specific surface area of 2.0 $m^2/g$ or more. The inorganic oxide filler has preferably a specific surface area of not more than 20 $m^2/g$ and more preferably a specific surface area of not more than 15 $m^2/g$. When the specific surface area of the inorganic oxide filler is too small, since an area of the inorganic oxide filler coming into contact with the electrolytic solution is small, there is a concern that the impregnating properties of the electrolytic solution are lowered. Also, when the specific surface area of the inorganic oxide filler is too large, there is a concern that a viscosity of the resin solution containing the inorganic oxide filler is high at the time of forming the functional resin layer 4b, so that the resin solution becomes a slurry in a gel form exhibiting structural viscosity. In that case, there may be the case where the addition of a prescribed amount of the inorganic oxide filler is difficult. Also, in the case of a slurry having a high viscosity, it is difficult to form the functional resin layer 4b.

A specific surface area can be measured by nitrogen gas adsorption method.

Furthermore, when the mean particle diameter [μm] and the specific surface area [$m^2/g$] of the inorganic oxide filler are defined as X and Y, respectively, it is preferable that a value of the product X×Y obtained by multiplying the mean particle diameter [μm] by the specific surface area [$m^2/g$] of the inorganic oxide filler is 1 or more and not more than 18. When the value of the product X×Y falls outside this range, a capacity retention rate is lowered.

As the resin constituting the functional resin layer 4b, a heat-resistant resin, a fluorocarbon based resin or the like can be used. So far as an amorphous resin is concerned, the heat-resistant resin as referred to herein means a resin having a glass transition temperature of 200° C. or higher. Also, so far as a crystalline resin is concerned, the heat-resistant resin means a resin having a glass transition temperature of 200° C. or higher and not having a melting point or having a melting point of 250° C. or higher.

As the heat-resistant resin, from the standpoint of dimensional stability in a high-temperature atmosphere, a resin having a glass transition temperature as high as possible is preferable; and from the standpoint that a dimensional change or contraction due to flowing can be minimized, a resin having entropy of fusion and not having a melting point is preferable. Specific examples of such a resin include polyphenylene sulfide, polysulfone, polyether sulfone, polyetheretherketone, polyarylate, polyether imide, polyamide-imide and polyimide.

When the heat-resistant resin is used as the resin constituting the functional resin layer 4b, an area contraction ratio at high temperatures can be lowered. For example, in the case where the area contraction ratio of the separator 4 is not more than 60%, safety of the battery can be conspicuously enhanced.

As the fluorocarbon based resin, polyvinylidene fluoride, polytetrafluoroethylene and the like can be used. When the fluorocarbon based resin is used as the resin constituting the functional resin layer 4b, electrochemical stability, impregnating properties of the electrolytic solution, holding properties of the electrolytic solution, flexibility and the like can be enhanced.

When such a resin material is used, it is preferable that a mixing ratio of the inorganic oxide filler and the resin is from about 10/1 to 30/1. When the mixing amount is too small, an addition effect of the inorganic oxide filler is not obtained. Also, when the mixing amount is too large, a holding force of the inorganic particle is lowered, and for example, falling off of the inorganic particle, or the like is easy to occur at the time of winding, and in that case, there is a concern that in a portion where the inorganic particle falls off, the liquid-holding properties are conspicuously lowered, so that the battery characteristics are deteriorated.

It is preferable that a thickness of the functional resin layer 4b is 1 μm or more and not more than 10 μm. Also, it is preferable that the mean particle diameter of the inorganic oxide filler is not more than 50% of the thickness of the functional resin layer 4b. This is because when the mean particle diameter of the inorganic oxide filler is too large relative to the thickness of the functional resin layer 4b, it is difficult to form the functional resin layer 4b.

In the separator 4, it is preferable that all of diameters of through-holes of the functional resin layer 4b obtained when measured by a bubble point method, a half-drying method and a method according to the Darcy's law fall within the range of 0.015 μm or more and not more than 20 μm; and that the number of through-holes of the functional resin layer 4b whose diameters are in the range of 0.02 μm or more and not more than 10 μm is 50% or more of the whole.

When the functional resin layer 4b has a through-hole having a diameter of less than 0.015 μm, the ion permeability is remarkably hindered, leading to deterioration of the battery characteristics such as deterioration of the cycle characteristic; whereas when the functional resin layer 4b has a through-hole having a diameter of more than 20 μm, there may be the case where an apparent resin density is lowered, so that a mechanical strength of the film is remarkably deteriorated. Thus, such is not preferable. Also, when the number of through-holes of the functional resin layer 4b whose diameters are in the range of 0.02 μm or more and not more than 10 μm is less than 50% of the whole, the foregoing phenomenon is easy to occur.

For example, even in a structure in which open holes of the surface are large, in the case of a structure in which the inside is so narrow that the ion passage is deteriorated, the battery characteristics are deteriorated. Therefore, as an evaluation index of the porosity, it is important to know the internal structure (narrowest hole portion) but not the open holes of the surface layer. When the diameter of the through-holes falls within the foregoing numerical value range, more excellent battery characteristics can be obtained.

It is preferable that a piercing strength of the separator 4 falls within the range of 100 gf or more and not more than 1,000 gf. This is because when the piercing strength of the separator 4 is too small, there may be the case where a short circuit occurs, whereas it is too large, the ion conductivity is lowered.

It is preferable that an air permeability of the separator 4 falls within the range 30 sec/100 cc or more and not more than 1,000 sec/100 cc. This is because when the air permeability of the separator 4 is too small, there may be the case where a short circuit occurs, whereas when it is too large, the ion conductivity is lowered.

The separator 4 is not limited to one having a double-layered structure of the base material layer 4a and the functional resin layer 4b as described above, but it may have a structure of three or more layers so far as it has the base material layer 4a and the functional resin layer 4b. Also, the separator 4 may be a single-layered structure of the functional resin layer 4b.

Furthermore, as the resin constituting the functional resin layer 4b, a mixture of two or more kinds of resins may be used. Moreover, the resin constituting the functional resin layer 4b is not limited to the heat-resistant resin or the fluorocarbon based resin, but any resin may be used so far as it is a resin capable of enhancing the performance of the separator and the battery characteristics.

(1-2) Manufacturing Method of Separator

A manufacturing method of the separator 4 according to the first embodiment is hereunder described.

[Fabrication of Base Material Layer]

A polyethylene resin and a liquid paraffin as a plasticizer are fed into a twin-screw extrude and melt kneaded to prepare a polyethylene solution. Subsequently, the polyethylene solution is extruded at a prescribed temperature from a T-die installed in a tip end of the extruder and molded into a sheet in a gel form while winding up by a cooling roll. Subsequently, this sheet in a gel form is biaxially stretched to obtain a thin film.

Subsequently, this thin film is washed with hexane to extract for removal the remaining liquid paraffin. Thereafter, the resulting thin film is dried and thermally treated to render it microporous. There can be thus obtained a polyethylene microporous film.

[Fabrication of Functional Resin Layer]

A resin solution obtained by dissolving a resin material and an inorganic oxide particle in a solvent such as N-methyl-2-pyrrolidone (NMP) is coated on the base material layer 4a using a table coater or the like, followed by phase separation in a poor solvent such as water. Thereafter, the resultant is dried by hot air or the like. There can be thus formed the functional resin layer.

[Effect]

By disposing the inorganic oxide filler, the wettability against the electrolytic solution is enhanced. The liquid-holding properties of the electrolytic solution tend to become favorable as the specific surface area increases. A relatively small particle size is more preferable.

However, when the particle size of the inorganic oxide filler to be used is smaller than the pore diameter of the separator, the inorganic oxide filler is filled in the pores of the base material layer by the separator compression to be caused due to expansion and contraction of the electrode following the charge/discharge. For that reason, the pores of the separator which are important for the ion conductivity cause clogging, resulting in deterioration of the cycle characteristic and load characteristic of the battery.

Also, when the particle size is large, the clogging is inhibited. However, in the coating step of the resin solution at the time of forming the inorganic oxide particle layer, there are caused such problems that an uncoated region is generated; and that the thickness of the coating film cannot be made thin. Thus, such is not preferable.

In the first embodiment, by controlling a mean particle diameter or a specific surface area of the inorganic oxide filler, or a value of the product of the mean particle diameter and the specific surface area, a separator which is excellent in impregnating properties and liquid-holding properties of an electrolytic solution can be obtained. Also, by incorporating the inorganic oxide filler, the oxidation resistance of the separator can be enhanced, and the heat conduction or heat sink effect which the inorganic oxide filler has can be enhanced.

2. Second Embodiment

Figure 3:
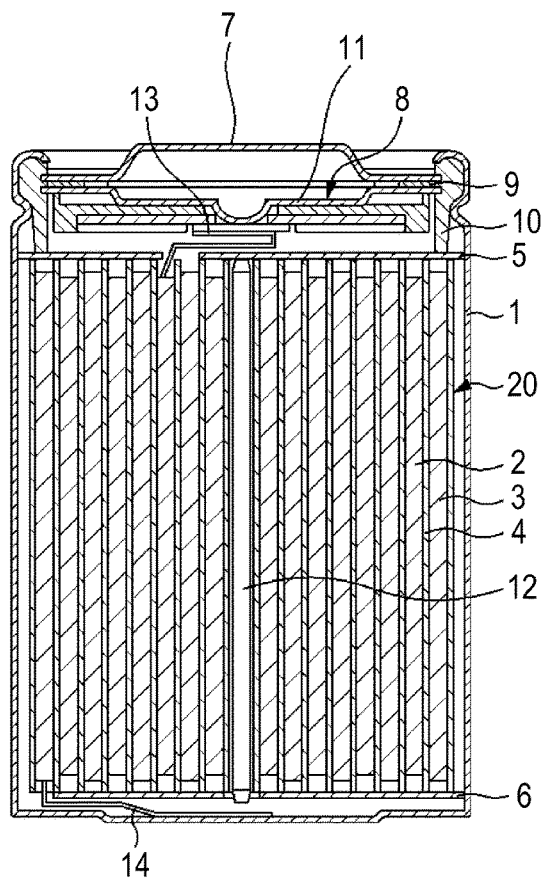
FIG. 3 is a sectional view illustrating a configuration of a battery according to a second embodiment.

In a second embodiment, a nonaqueous electrolyte battery using the foregoing separator is described with reference to the accompanying drawings. FIG. 3 shows a sectional structure of a nonaqueous electrolyte battery according to the second embodiment.

(2-1) Configuration of Nonaqueous Electrolyte Battery

This nonaqueous electrolyte battery is of a so-called cylindrical type and has a wound electrode body 20 having a strip-shaped positive electrode 2 and a strip-shaped negative electrode 3 wound via a separator 4 in the inside of a substantially hollow columnar battery can 1.

The battery can 1 is constituted of, for example, nickel (NI)-plated iron (Fe), and one end thereof is closed, with the other end being opened. In the inside of the battery can 1, a pair of insulating plates 5 and 6 is respectively disposed vertical to the winding peripheral face so as to interpose the wound electrode body 20 therebetween.

In the open end of the battery can 1, a battery lid 7 is installed by caulking with a safety valve mechanism 8 and a positive temperature coefficient device (PTC device) 9 provided in the inside of this battery lid 7 via a gasket 10, and the inside of the battery can 1 is hermetically sealed. The battery lid 7 is constituted of, for example, the same material as that in the battery can 1. The safety valve mechanism 8 is electrically connected to the battery lid 7 via the positive temperature coefficient device 9. In this safety valve mechanism 8, when the internal pressure of the battery reaches a fixed value or more due to an internal short circuit or heating from the outside or the like, a disc plate 11 is reversed, whereby electrical connection between the battery lid 7 and the wound electrode body 20 is disconnected.

When the temperature rises, the positive temperature coefficient device 9 controls the current by an increase of the resistance value, thereby preventing abnormal heat generation to be caused due to a large current. The gasket 10 is constituted of, for example, an insulating material, and asphalt is coated on the surface thereof.

For example, the wound electrode body 20 is wound on the center of a center pin 12. In the wound electrode body 20, a positive electrode lead 13 made of aluminum (Al) or the like is connected to the positive electrode 2; and a negative electrode lead 14 made of nickel (Ni) or the like is connected to the negative electrode 3. The positive electrode lead 13 is electrically connected to the battery lid 7 by means of welding with the safety valve mechanism 8; and the negative electrode lead 14 is electrically connected to the battery can 1 by means of welding.

[Positive Electrode]

Figure 4:
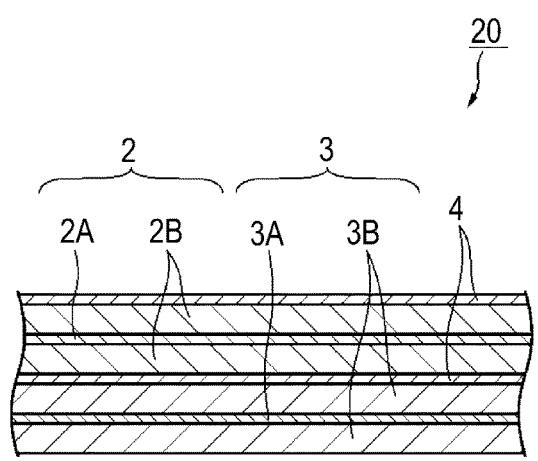
FIG. 4 is a sectional view enlargedly illustrating a part of a wound electrode body in the battery shown in FIG. 3.

FIG. 4 shows enlargedly a part of the wound electrode body 20 shown in FIG. 3. As shown in FIG. 4, the positive electrode 2 has, for example, a positive electrode collector 2A having a pair of surfaces opposing to each other and a positive electrode mixture layer 2B provided on the both surfaces of the positive electrode collector 2A. The positive electrode 2 may be one having a region where the positive electrode mixture layer 2B is provided on only one surface of the positive electrode collector 2A. The positive electrode collector 2A is constituted of a metal foil, for example, an aluminum (Al) foil, etc. The positive electrode mixture layer 2B contains, for example, a positive electrode active material and may further contain a conductive agent such as graphite and a binder such as polyvinylidene fluoride, if desired.

As the positive electrode active material, a positive electrode material capable of intercalating and deintercalating lithium can be used. Specifically, as the positive electrode material, lithium-containing compounds such as a lithium oxide, a lithium phosphate, a lithium sulfide and an intercalation compound containing lithium are suitable. A mixture of two or more kinds thereof may be used. In order to increase the energy density, lithium-containing compounds containing lithium (Li), a transition metal element and oxygen (O) are preferable. Above all, those containing, as the transition metal element, at least one member selected from the group consisting of cobalt (Co), nickel (Ni), manganese (Mn) and iron (Fe) are more preferable.

As such a lithium-containing compound, for example, a lithium complex oxide having a mean composition represented by the following formula (I), and more specifically the following formula (II); and a lithium complex oxide having a mean composition represented by the following formula (III) can be exemplified.

$$Li_pNi_{(1-q-r)}Mn_qM1_rO_{(2-s)}X_t \qquad (I)$$

In the formula (I), M1 represents at least one member selected from the group consisting of elements belonging to the groups 2 to 15 excluding nickel (Ni) and manganese (Mn); X represents at least one member selected from the group consisting of elements belonging to the group 16 and elements belonging to the group 17 excluding oxygen (O); and p, q, r, s and t represent values falling within the ranges of $0 \leq p \leq 1.5$, $0 \leq q \leq 1.0$, $0 \leq r \leq 1.0$, $-0.10 \leq s \leq 0.20$ and $0 \leq t \leq 0.2$, respectively. The composition of lithium varies depending upon the charge/discharge state, and the value of p represents a value in a complete discharge state.

$$Li_aCo_{(1-b)}M2_bO_{2-c} \qquad (II)$$

In the formula (II), M2 represents at least one member selected from the group consisting of vanadium (V), copper (Cu), zirconium (Zr), zinc (Zn), magnesium (Mg), aluminum (Al), gallium (Ga), yttrium (Y) and iron (Fe); and a, b and c represent values falling within the ranges of $0.9 \leq a \leq 1.1$, $0 \leq b \leq 0.3$ and $-0.1 \leq c \leq 0.1$, respectively. The composition of lithium varies depending upon the charge/discharge state, and the value of a represents a value in a complete discharge state.

$$Li_vNi_wCo_xMn_yM3_{(1-v-x-y)}O_{(2-z)} \qquad (III)$$

In the formula (III), M3 represents at least one member selected from the group consisting of vanadium (V), copper (Cu), zirconium (Zr), zinc (Zn), magnesium (Mg), aluminum (Al), gallium (Ga), yttrium (Y) and iron (Fe); and v, w, x, y and z represent values falling within the ranges of $0.9 \leq v \leq 1.1$, $0 < w < 1$, $0 < x < 1$, $0 < y < 0.5$, $0 \leq (1-v-x-y)$ and $-0.1 \leq z \leq 0.1$, respectively. The composition of lithium varies depending upon the charge/discharge state, and the value of v represents a value in a complete discharge state.

Furthermore, as the lithium-containing compound, for example, a lithium complex oxide having a structure of a spinel type represented by the following formula (IV), and more specifically $Li_dMn_2O_4$ ($d \approx 1$) can be exemplified.

$$Li_eMn_{(2-f)}M4_fO_gF_h \qquad (IV)$$

In the formula (IV), M4 represents at least one member selected from the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W); and e, f, g and h represent values falling within the ranges of $0.9 \leq e \leq 1.1$, $0 \leq f \leq 0.6$, $3.7 \leq g \leq 4.1$ and $0 \leq h \leq 0.1$, respectively. The composition of lithium varies depending upon the charge/discharge state, and the value of e represents a value in a complete discharge state.

Furthermore, as the lithium-containing compound, for example, a lithium complex phosphate having a structure of an olivine type represented by the following formula (V), and more specifically the following formula (VI) can be exemplified; and further specifically, $Li_iFePO_4$ (i≅1) can be exemplified.

$$Li_jM5_kPO_4 \quad (V)$$

In the formula (V), M5 represents at least one member selected from the group consisting of elements belonging to the groups 2 to 15; and j and k represent values falling within the ranges of $0 \leq j \leq 2.0$ and $0.5 \leq k \leq 2.0$, respectively. The composition of lithium varies depending upon the charge/discharge state, and the value of j represents a value in a complete discharge state.

$$Li_mM6PO_4 \quad (VI)$$

In the formula (VI), M6 represents at least one member selected from the group consisting of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W) and zirconium (Zr); and m represents a value falling within the range of $0.9 \leq m \leq 1.1$. The composition of lithium varies depending upon the charge/discharge state, and the value of m represents a value in a complete discharge state.

In addition to the foregoing positive electrode materials, as the positive electrode material capable of intercalating and deintercalating lithium (Li), lithium-free inorganic compounds such as $MnO_2$, $V_2O_5$, $V_6O_{13}$, NiS and MoS can be exemplified.

[Negative Electrode]

The negative electrode 3 has, for example, a structure in which a negative electrode mixture layer 3B is provided on the both surfaces of a negative electrode collector 3A having a pair of surfaces opposing to each other. While illustration is omitted, the negative electrode mixture layer 3B may be provided on only one surface of the negative electrode collector 3A. The negative electrode collector 3A is constituted of a metal foil, for example, a copper foil, etc.

The negative electrode mixture layer 3B is constituted so as to contain, as a negative electrode active material, one or two or more kinds of negative electrode materials capable of intercalating and deintercalating lithium and further contain the same binder as that in the positive electrode mixture layer 2B, if desired.

In this nonaqueous electrolyte battery, an electrochemical equivalent of the negative electrode material capable of intercalating and deintercalating lithium is larger than an electrochemical equivalent of the positive electrode 2, and a lithium metal does not deposit on the negative electrode 3 on the way of charge.

Also, this nonaqueous electrolyte battery is designed such that an open circuit voltage (namely, a battery voltage) in a full charge state falls within the range of, for example, 4.2 V or more and not more than 4.6 V. For example, in the case where the open circuit voltage in a full charge state is 4.25 V or more, in comparison with a 4.2-V battery, even when the same positive electrode active material is concerned, a deintercalation amount of lithium per unit mass is large, and therefore, the amounts of the positive electrode active material and the negative electrode active material are regulated in response thereto, and a high energy density is obtainable.

Examples of the negative electrode material capable of intercalating and deintercalating lithium include carbon materials such as graphite, hardly graphitized carbon, easily graphitized carbon, pyrolytic carbons, cokes, vitreous carbons, organic polymer compound burned materials, carbon fibers and active carbon.

Of these, examples of the cokes include pitch coke, needle coke and petroleum coke. The organic polymer compound burned material as referred to herein means a material obtained through carbonization by burning a polymer material such as phenol resins and furan resins at an appropriate temperature, and a part thereof is classified into hardly graphitized carbon or easily graphitized carbon. Also, examples of the polymer material include polyacetylene and polypyrrole.

Such a carbon material is preferable because a change in the crystal structure to be generated at the time of charge/discharge is very small, a high charge/discharge capacity is obtainable, and a favorable cycle characteristic is obtainable. In particular, graphite is preferable because its electrochemical equivalent is large, and a high energy density is obtainable. Also, hardly graphitized carbon is preferable because excellent characteristics are obtainable. Moreover, a material having a low charge/discharge potential, and specifically one having a charge/discharge potential close to a lithium metal, is preferable because it is easy to realize a high energy density of the battery.

Examples of the negative electrode material capable of intercalating and deintercalating lithium include a material capable of intercalating and deintercalating lithium and containing, as a constituent element, at least one member selected from the group consisting of metal elements and semi-metal elements. This is because by using such a material, a high energy density is obtainable. In particular, the joint use of such a material with the carbon material is more preferable because not only a high energy density is obtainable, but an excellent cycle characteristic is obtainable. This negative electrode material may be a simple substance, an alloy or a compound of a metal element or a semi-metal element. Also, the negative electrode material may be an electrode material having one or two or more kinds of such a phase in at least a part thereof. In the second embodiment according to the present invention, the alloy includes alloys containing at least one metal element and at least one semi-metal element in addition to alloys composed of two or more metal elements. Also, the negative electrode material may contain a non-metal element. Examples of its texture include a solid solution, a eutectic (eutectic mixture), an intermetallic compound and one in which two or more thereof coexist.

Examples of the metal element or semi-metal element which constitutes this negative electrode material include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd) and platinum (Pt). These may be crystalline or amorphous.

Of these, ones containing, as a constituent element, a metal element or a semi-metal element belonging to the group 4B in the short form of the periodic table are preferable, and ones containing, as a constituent element, at least one of silicon (Si) and tin (Sn) are especially preferable as this negative electrode material. This is because silicon (Si) and tin (Sn) have large capability of intercalating and deintercalating lithium (Li), and a high energy density is obtainable.

Examples of alloys of tin (Sn) include alloys containing, as a second constituent element other than tin (Sn), at least one member selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr). Examples of alloys of silicon (Si) include alloys containing, as a second constituent element other than silicon (Si), at least one member selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr).

Examples of compounds of tin (Sn) or compounds of silicon (Si) include compounds containing oxygen (O) or carbon (C), and these compounds may contain the foregoing second constituent element in addition to tin (Sn) or silicon (Si).

Furthermore, examples of the negative electrode material capable of intercalating and deintercalating lithium include other metal compounds and polymer materials. Examples of other metal compounds include oxides such as $MnO_2$, $V_2O_5$ and $V_6O_{13}$; sulfides such as NiS and MOS; and lithium nitrides such as $LiN_3$. Examples of polymer materials include polyacetylene, polyaniline and polypyrrole.

[Electrolytic Solution]

As the electrolytic solution, a nonaqueous electrolytic solution having an electrolyte salt dissolved in a nonaqueous solvent can be used. It is preferable that the nonaqueous solvent contains, for example, at least one of ethylene carbonate (EC) and propylene carbonate (PC). This is because the cycle characteristic can be enhanced. In particular, that the nonaqueous solvent contains a mixture of ethylene carbonate (EC) and propylene carbonate (PC) is preferable because the cycle characteristic can be more enhanced. It is preferable that the nonaqueous solvent contains at least one member of chain carbonates such as diethyl carbonate (DEC), dimethyl carbonate (DMC), ethyl methyl carbonate (EMC) and methyl propyl carbonate (MPC). This is because the cycle characteristic can be more enhanced.

It is preferable that at least one of 2,4-difluoroanisole and vinylene carbonate (VC) is contained as the nonaqueous solvent. This is because 2,4-difluoroanisole is able to improve the discharge capacity; and vinylene carbonate (VC) is able to further enhance the cycle characteristic. In particular, it is more preferable that a mixture of these materials is contained because both of the discharge capacity and the cycle characteristic can be improved.

The nonaqueous solvent may further contain one or two or more kinds of butylene carbonate (BC), γ-butyrolactone, γ-valerolactone, compounds obtained by substituting a part or all of the hydrogen groups of such a compound with a fluorine group, 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutanitrile, adiponitrile, methoxyacetonitrile, 3-methoxypropyronitrile, N,N-dimethylformamide, N-methylpyrrolidinone, N-methyloxazolidinone, N,N-dimethylimidazolidinone, nitromethane, nitroethane, sulfolane, dimethyl sulfoxide and trimethyl phosphate.

There may be the case where by using a compound obtained by substituting a part or all of the hydrogen atoms of a substance included in the foregoing nonaqueous solvent group with a fluorine atom, the reversibility of an electrode reaction is enhanced depending upon the electrode to be combined. In consequence, it is also possible to properly use such a substance.

As the lithium salt which is an electrolyte salt, for example, $LiPF_6$, $LiBF_4$, $LiAsF_6$, $LiClO_4$, $LiB(C_6H_5)_4$, $LiCH_3SO_3$, $LiCF_3SO_3$, $LiN(SO_2CH_3)_2$, $LiC(SO_2CF_3)_3$, $LiAlCl_4$, $LiSiF_6$, $LiCl$, $LiBF_2(ox)$ [lithium difluorooxalate borate], LiBOB [lithium bisoxalate borate] or LiBr is suitable. These materials can be used singly or in combinations of two or more kinds thereof. Above all, $LiPF_6$ is preferable because not only high ion conductivity can be obtained, but the cycle characteristic can be enhanced.

(2-2) Manufacturing Method of Nonaqueous Electrolyte Battery

Next, a manufacturing method of the nonaqueous electrolyte battery according to the second embodiment is described. The manufacturing method of the nonaqueous electrolyte battery is hereunder described with reference to a nonaqueous electrolyte battery of a cylindrical type as an example.

[Fabrication of Positive Electrode]

The positive electrode 2 is fabricated in a manner described below. First of all, for example, a positive electrode active material, a conductive agent and a binder are mixed to prepare a positive electrode mixture, and this positive electrode mixture is dispersed in a solvent such as N-methyl-2-pyrrolidone, thereby preparing a positive electrode mixture slurry.

Subsequently, this positive electrode mixture slurry is coated on the positive electrode collector 2A, and the solvent is then dried. The resultant is compression molded by a roll press or the like to form the positive electrode mixture layer 2B. There is thus fabricated the positive electrode 2.

[Fabrication of Negative Electrode]

The negative electrode 3 is fabricated in a manner described below. First of all, for example, a negative electrode active material and a binder are mixed to prepare a negative electrode mixture, and this negative electrode mixture is dispersed in a solvent such as N-methyl-2-pyrrolidone, thereby preparing a negative electrode mixture slurry.

Subsequently, this negative electrode mixture slurry is coated on the negative electrode collector 3A, and the solvent is then dried. The resultant is compression molded by a roll press or the like to form the negative electrode mixture layer 3B. There is thus fabricated the negative electrode 3.

[Assembling of Nonaqueous Electrolyte Battery]

Subsequently, the positive electrode lead 13 is installed in the positive electrode collector 2A by means of welding or the like, and the negative electrode lead 14 is also installed in the negative electrode collector 3A by means of welding or the like. Subsequently, the positive electrode 2 and the negative electrode 3 are wound via the separator 4; a tip portion of the positive electrode lead 13 is welded with the safety valve mechanism 8; and a tip portion of the negative electrode lead 14 is also welded with the battery can 1. The wound positive electrode 2 and negative electrode 3 are interposed between a pair of the insulating plates 5 and 6 and housed in the inside of the battery can 1.

Subsequently, an electrolytic solution is injected into the inside of the battery can 1, thereby impregnating the electrolytic solution in the separator 4. Subsequently, the battery lid 7, the safety valve mechanism 8 and the positive temperature coefficient device 9 are fixed to the open end portion of the battery can 1 upon being caulked via the gasket 10. There is thus fabricated the nonaqueous electrolyte battery according to the second embodiment.

In the nonaqueous electrolyte battery according to the second embodiment, when charged, for example, a lithium ion is deintercalated from the positive electrode 2 and intercalated in the negative electrode 3 via the electrolytic solution. When discharged, for example, a lithium ion is deintercalated from the negative electrode 3 and intercalated in the positive electrode 2 via the electrolytic solution.

3. Third Embodiment

(3-1) Configuration of Nonaqueous Electrolyte Battery

Figure 5:
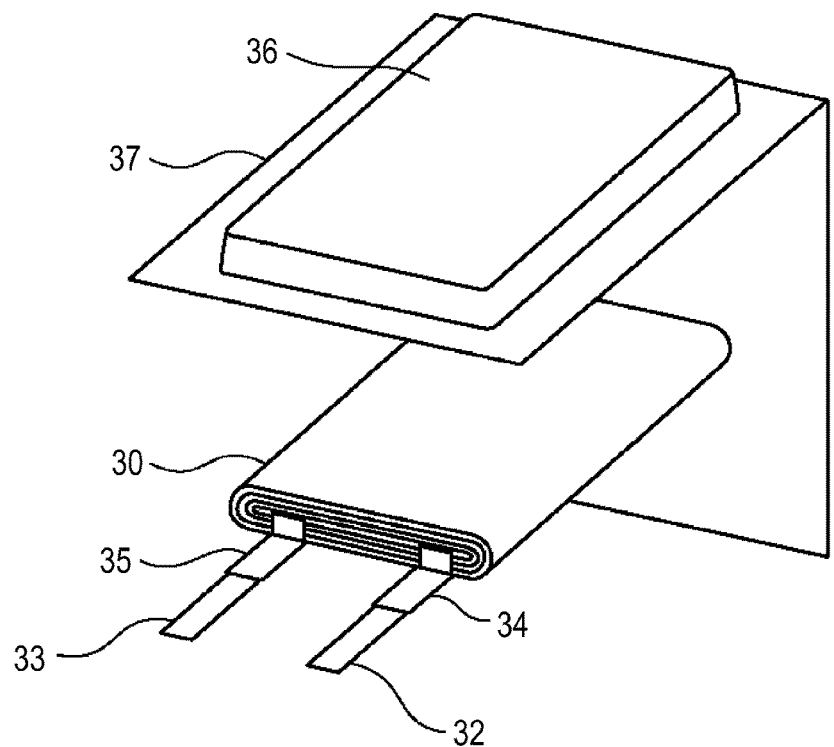
FIG. 5 is a sectional view illustrating a configuration of a battery according to a third embodiment.

A third embodiment is described. FIG. 5 shows a structure of a nonaqueous electrolyte battery according to the third embodiment. As shown in FIG. 5, this nonaqueous electrolyte battery is fabricated by housing a battery element 30 into an exterior material 37 made of a moisture-proof laminated film and sealing the exterior material 37 by melt-bonding the circumference of the battery element 30. A positive electrode lead 32 and a negative electrode lead 33 are provided in the battery element 30, and these leads are interposed between the exterior materials 37 and led out to the outside. The both surfaces of each of the positive electrode lead 32 and the negative electrode lead 33 are coated with a resin piece 34 and a resin piece 35, respectively for the purpose of enhancing the adhesion to the exterior material 37.

[Exterior Material]

The exterior material 37 has a laminated structure in which, for example, a heat-fusible layer, a metal layer and a surface protective layer are sequentially laminated. The heat-fusible layer is made of a polymer film. Examples of a material constituting the polymer film include polypropylene (PP), polyethylene (PE), cast polypropylene (CPP), linear low density polyethylene (LLDPE) and low density polyethylene (LDPE). The metal layer is made of a metal foil. Examples of a material constituting the metal foil include aluminum (Al). Also, as a material constituting the metal foil, a metal other than aluminum can also be used. Examples of a material constituting the surface protective layer include nylon (Ny) and polyethylene terephthalate (PET). The surface on the heat-fusible layer side becomes a housing surface on the side where the battery element 30 is housed.

[Battery Element]

Figure 6:
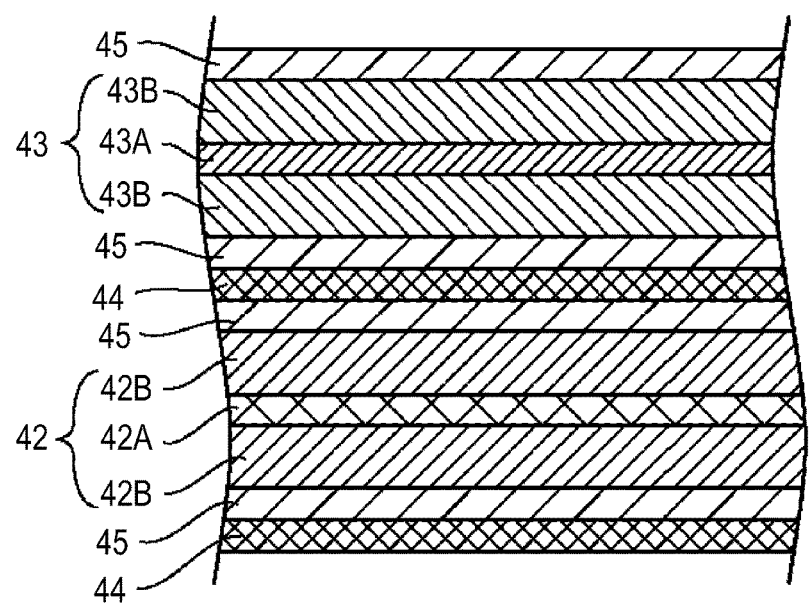
FIG. 6 is a sectional view of a wound electrode body shown in FIG. 5.

As shown in FIG. 6, this battery element 30 is, for example, a battery element 30 of a winding type in which a strip-shaped negative electrode 43 having a gel electrolyte layer 45 provided on each surface thereof, a separator 44, a strip-shaped positive electrode 42 having a gel electrolyte layer 45 provided on each surface thereof and a separator 44 are laminated and wound in a longitudinal direction thereof. A detailed description of a structure of the separator 44 and the like is omitted because it is the same as that in the second embodiment.

[Positive Electrode]

The positive electrode 42 is composed of a strip-shaped positive electrode collector 42A and a positive electrode mixture layer 42B formed on each surface of the positive electrode collector 42A. The positive electrode collector 42A is, for example, a metal foil made of aluminum (Al) or the like.

The positive electrode lead 32 connected by, for example, spot welding or ultrasonic welding is provided in one end portion in a longitudinal direction of the positive electrode 42. As a material of the positive electrode lead 32, for example, a metal such as aluminum can be used.

[Negative Electrode]

The negative electrode 43 is composed of a strip-shaped negative electrode collector 43A and a negative electrode mixture layer 43B formed on each surface of the negative electrode collector 43A. The negative electrode collector 43A is, for example, constituted of a metal foil such as a copper (Cu) foil, a nickel foil and a stainless steel foil.

Also, similar to the positive electrode 42, the negative electrode lead 33 connected by, for example, spot welding or ultrasonic welding is provided in one end portion in a longitudinal direction of the negative electrode 43. As a material of the negative electrode lead 33, for example, copper (Cu), nickel (Ni) or the like can be used.

Since a construction other than the gel electrolyte layer 45 is the same as that in the foregoing second embodiment, the gel electrolyte layer 45 is hereunder described.

[Gel Electrolyte Layer]

The gel electrolyte layer 45 contains an electrolytic solution and a polymer compound serving as a holding member for holding the electrolytic solution and is shaped in a so-called gel form. The gel electrolyte layer 45 is preferable because not only a high ion conductivity can be obtained, but liquid leakage of the battery can be prevented. A construction of the electrolytic solution (that is, a liquid solvent, an electrolytic salt and an additive) is the same as that in the second embodiment according to the present invention.

Examples of the polymer compound include polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, a styrene-butadiene rubber, a nitrile-butadiene rubber, polystyrene and polycarbonate. Polyacrylonitrile, polyvinylidene fluoride, polyhexafluoropropylene and polyethylene oxide are especially preferable from the standpoint of electrochemical stability.

(3-2) Manufacturing Method of Nonaqueous Electrolyte Battery

Next, a manufacturing method of the nonaqueous electrolyte battery according to the third embodiment is described. First of all, a precursor solution containing a solvent, an electrolyte salt, a polymer compound and a mixed solvent is coated on each of the positive electrode 42 and the negative electrode 43, and the mixed solvent is evaporated to form a gel electrolyte layer 45. The positive electrode lead 32 is previously installed in an end portion of the positive electrode collector 42A by means of welding, and the negative electrode lead 33 is also previously installed in an end portion of the negative electrode collector 43A by means of welding.

Subsequently, the positive electrode 42 and the negative electrode 43, each having the gel electrolyte layers 45 formed thereon, are laminated via the separator 44 to form a laminate, and the laminate is then wound in a longitudinal direction thereof, thereby forming the battery element 30 of a winding type.

Subsequently, a concave portion 36 is formed by deep-drawing the exterior material 37 made of a laminated film. The battery element 30 is inserted into the concave portion 36. An unprocessed portion of the exterior material 37 is folded back to an upper portion of the concave portion 36, and an outer peripheral portion of the concave portion 36 is hermetically sealed by means of heat fusion. In this way, the nonaqueous electrolyte battery according to the third embodiment is fabricated.

EXAMPLES

The embodiments are is hereunder described in detail with reference to the following Examples and Comparative Examples, but it should not be construed that the present invention is limited to only these Examples and Comparative Examples.

Example 1

In Example 1, aluminum oxide ($Al_2O_3$) having a mean particle diameter (X) of 0.20 μm and a specific surface are (Y) of 13.0 m$^2$/g (X×Y=2.60) was used. This aluminum oxide ($Al_2O_3$) and polyvinylidene fluoride (PVdF) were mixed in a mass ratio of 20/1, and the mixture was dissolved in N-methyl-pyrrolidone as a solvent, thereby preparing a resin solution.

Subsequently, this resin solution was coated on a polyethylene microporous film having a pore diameter of 17.9 nm by a table coater and then put into a water bath to achieve phase separation, followed by drying by hot air. There was thus obtained a multilayered separator composed of a base material layer made of the polyethylene microporous film and a coating layer containing aluminum oxide ($Al_2O_3$) and polyvinylidene fluoride (PVdF) and having a porous interconnected structure.

As the polyethylene microporous film, one prepared in a manner described below was used. First of all, a polyethylene resin and a liquid paraffin as a plasticizer were fed into a twin-screw extruder and melt kneaded to prepare a polyethylene solution.

Subsequently, the polyethylene solution was extruded at a prescribed temperature from a T-die installed in a tip of the extruder and molded into a sheet in a gel form while winding up by a cooling roll. Subsequently, this sheet in a gel form was biaxially stretched to obtain a thin film.

Subsequently, this thin film was washed with hexane to extract for removal the remaining liquid paraffin. Thereafter, the resulting thin film was dried and thermally treated to render it microporous. There was thus obtained the polyethylene microporous film.

Example 2

A multilayered separator was fabricated in the same manner as in Example 1, except that the mean particle diameter (X) and the specific surface area (Y) of aluminum oxide to be used for the surface layer were changed to 0.40 μm and 5.2 m$^2$/g (X×Y=2.08), respectively.

Example 3

A multilayered separator was fabricated in the same manner as in Example 1, except that the mean particle diameter (X) and the specific surface area (Y) of aluminum oxide to be used for the surface layer were changed to 0.80 μm and 18.2 m$^2$/g (X×Y=14.56), respectively.

Example 4

A multilayered separator was fabricated in the same manner as in Example 1, except that the mean particle diameter (X) and the specific surface area (Y) of aluminum oxide to be used for the surface layer were changed to 1.20 μm and 18.2 m$^2$/g (X×Y=17.04), respectively.

Example 5

A multilayered separator was fabricated in the same manner as in Example 1, except that the mean particle diameter (X) and the specific surface area (Y) of aluminum oxide to be used for the surface layer were changed to 0.42 μm and 15.0 m$^2$/g (X×Y=6.30), respectively.

Example 6

A multilayered separator was fabricated in the same manner as in Example 1, except that the mean particle diameter (X) and the specific surface area (Y) of aluminum oxide to be used for the surface layer were changed to 0.30 μm and 7.0 m$^2$/g (X×Y=2.10), respectively.

Example 7

A multilayered separator was fabricated in the same manner as in Example 1, except that the mean particle diameter (X) and the specific surface area (Y) of aluminum oxide to be used for the surface layer were changed to 0.80 μm and 10.0 m$^2$/g (X×Y=7.98), respectively.

Example 8

A multilayered separator was fabricated in the same manner as in Example 1, except that the mean particle diameter (X) and the specific surface area (Y) of aluminum oxide to be used for the surface layer were changed to 0.30 μm and 15.3 m$^2$/g (X×Y=4.60), respectively.

Example 9

A multilayered separator was fabricated in the same manner as in Example 1, except that the mean particle diameter (X) and the specific surface area (Y) of aluminum oxide to be used for the surface layer were changed to 1.20 μm and 12.3 m$^2$/g (X×Y=14.72), respectively.

Example 10

A multilayered separator was fabricated in the same manner as in Example 1, except that the mean particle diameter (X) and the specific surface area (Y) of aluminum oxide to be used for the surface layer were changed to 0.30 μm and 59.8 m$^2$/g (X×Y=17.94), respectively.

Comparative Example 1

A multilayered separator was fabricated in the same manner as in Example 1, except that the mean particle diameter (X) and the specific surface area (Y) of aluminum oxide to be used for the surface layer were changed to 0.09 μm and 1.8 m$^2$/g (X×Y=0.16), respectively.

Comparative Example 2

A multilayered separator was fabricated in the same manner as in Example 1, except that the mean particle diameter (X) and the specific surface area (Y) of aluminum oxide to be used for the surface layer were changed to 0.30 μm and 3.0 m$^2$/g (X×Y=0.90), respectively.

Comparative Example 3

A multilayered separator was fabricated in the same manner as in Example 1, except that the mean particle diameter (X) and the specific surface area (Y) of aluminum oxide to be used for the surface layer were changed to 0.50 µm and 1.5 m²/g (X×Y=0.75), respectively.

Comparative Example 4

A multilayered separator was fabricated in the same manner as in Example 1, except that the mean particle diameter (X) and the specific surface area (Y) of aluminum oxide to be used for the surface layer were changed to 0.10 µm and 5.0 m²/g (X×Y=0.50), respectively.

Comparative Example 5

A multilayered separator was fabricated in the same manner as in Example 1, except that the mean particle diameter (X) and the specific surface area (Y) of aluminum oxide to be used for the surface layer were changed to 0.30 µm and 63.8 m²/g (X×Y=19.15), respectively.

Comparative Example 6

A multilayered separator was fabricated in the same manner as in Example 1, except that the mean particle diameter (X) and the specific surface area (Y) of aluminum oxide to be used for the surface layer were changed to 0.12 µm and 150.3 m²/g (X×Y=18.04), respectively.

Comparative Example 7

A multilayered separator was fabricated in the same manner as in Example 1, except that the mean particle diameter (X) and the specific surface area (Y) of aluminum oxide to be used for the surface layer were changed to 1.40 µm and 14.7 m²/g (X×Y=20.58), respectively.

Comparative Example 8

A multilayered separator was fabricated in the same manner as in Example 1, except that the mean particle diameter (X) and the specific surface area (Y) of aluminum oxide to be used for the surface layer were changed to 8.00 µm and 2.3 m²/g (X×Y=18.40), respectively.

Comparative Example 9

A multilayered separator was fabricated in the same manner as in Example 1, except that the mean particle diameter (X) and the specific surface area (Y) of aluminum oxide to be used for the surface layer were changed to 30.00 µm and 0.7 m²/g (X×Y=21.00), respectively.

Comparative Example 10

A multilayered separator was fabricated in the same manner as in Example 1, except that the mean particle diameter (X) and the specific surface area (Y) of aluminum oxide to be used for the surface layer were changed to 26.00 µm and 0.7 m²/g (X×Y=18.20), respectively.

Comparative Example 11

A single-layered separator composed of only a base material layer was used without providing a surface layer.
[Evaluation of Separator]
With respect to the separator of each of the Examples and Comparative Examples, a pore size of the surface layer and a contact angle against the surface layer were measured in manners described below.

(a) Measurement of Through-Hole Diameter

With respect to each of the fabricated separators, a pore size of the surface layer was measured. The measurement of the pore size of the surface layer was carried out using a liquid extrusion porosimeter (LEP-200-A), manufactured by Seika Corporation (according to the bubble point method and the Darcy's law) and a perm porometer (CFP-1500A), manufactured by Seika Corporation (according to the bubble point method and the half-drying method).

(b) Measurement of Contact Angle

Figure 2:
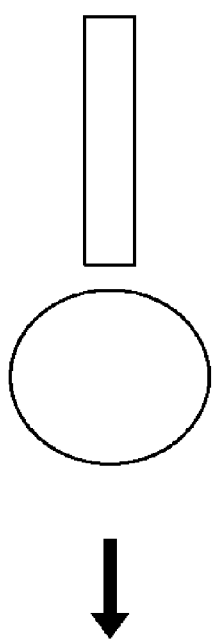
FIG. 2 is a schematic view showing a measurement method of a contact angle in a first embodiment.
Figure 2:
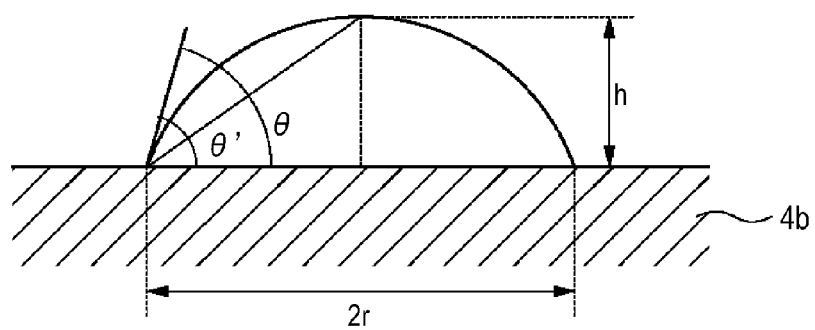

A contact angle between the fabricated separator and the solution was measured using an automated contact angle meter, manufactured by Kyowa Interface Science Co., Ltd. As shown in FIG. 2, the contact angle is an angle between the solution and the separator and the base material ten seconds after dropping a droplet. For the measurement of the contact angle, a solution having the same construction as that of a general electrolytic solution, which was prepared by adding 1.1 moles/kg of lithium hexafluorophosphate ($LiPF_6$) as an electrolyte salt to a nonaqueous solvent of a mixture of ethylene carbonate (EC) and diethyl carbonate (DEC) in a volume ratio of 4/6, was used.

[Evaluation of Nonaqueous Electrolyte Battery]

A coin type battery having a 2016 size was fabricated using the separator of each of the foregoing Examples and Comparative Examples, and a capacity retention rate at the time of 100 cycles was measured.

(Fabrication of Positive Electrode)

Lithium cobaltate ($LiCoO_2$) as a positive electrode active material, carbon black as a conductive agent and polyvinylidene fluoride as a binder were mixed in a mass ratio of 85/5/10, and the mixture was sufficiently dispersed in N-methyl-2-pyrrolidone to prepare a positive electrode mixture slurry.

Subsequently, the positive electrode mixture slurry was coated on a positive electrode collector and then dried to evaporate the N-methyl-2-pyrrolidone, followed by compression molding under a fixed pressure. There was thus fabricated a strip-shaped positive electrode.

(Fabrication of Negative Electrode)

Graphite as a negative electrode active material and polyvinylidene fluoride as a binder were mixed in a mass ratio of 90/10, and the mixture was sufficiently dispersed in N-methyl-2-pyrrolidone to prepare a negative electrode mixture slurry.

Subsequently, the negative electrode mixture slurry was coated on a negative electrode collector and then dried to evaporate the N-methyl-2-pyrrolidone, followed by compression molding under a fixed pressure. There was thus fabricated a strip-shaped negative electrode.

(Preparation of Nonaqueous Electrolytic Solution)

As a nonaqueous solvent, a mixture of ethylene carbonate (EC) and dimethyl carbonate (DMC) in a volume ratio of 4/6 was used. Also, lithium hexafluorophosphate ($LiPF_6$) was used as an electrolyte salt and dissolved in an amount of 1.0 mole/L in the nonaqueous solvent, thereby preparing a nonaqueous electrolytic solution.

(Assembling of Nonaqueous Electrolyte Battery)

The thus fabricated strip-shaped positive electrode and negative electrode were punched in a disc shape, and the positive electrode, the negative electrode and the fabricated separator were laminated in the order of the positive electrode, the separator and the negative electrode and housed in a positive electrode can. Subsequently, the foregoing nonaqueous electrolytic solution was injected into a battery can, and the positive electrode can and the negative electrode can were caulked via a gasket having asphalt coated on the surface thereof. There was thus obtained a battery having a 2016 size.

(c) Capacity Retention Rate

The fabricated coin type battery was charged such that an open circuit voltage in a full charge state reached 4.2 V, and thereafter, on the occasion of discharging at a constant current of 0.2 C such that the voltage reached 3.0 V, a discharge capacity (initial capacity) was measured. Thereafter, the charge/discharge was carried out under the same condition for 100 cycles, and a discharge capacity at the 100th cycle was measured. Then, a capacity retention rate was calculated according to the following expression.

[Capacity retention rate (%)]=[(Discharge capacity at the 100th cycle)/(Initial capacity)]×100 a layer having a structure in which a large number of independent pores which are not interconnected to each other is formed. For that reason, a porous interconnected structure is not revealed.

On the other hand, when the concentration of each of the inorganic oxide filler and the resin material in the solvent is too low, the resin has a spherical droplet structure in a state where the resin solution is coated on the polyethylene microporous film. For that reason, when the resin solution is put in a water bath to achieve phase separation, followed by drying, in view of the fact that a large number of resin droplets are not bounded to each other, falling off of the resin occurs. For that reason, the functional resin layer according to the embodiments is not realized.

The pore size of the surface layer, the contact angle and the evaluation results are shown in Table 1.

TABLE 1

| | | Surface layer | | | | Base material layer | | | |
|---|---|---|---|---|---|---|---|---|---|
| | Inorganic oxide filler | X: Mean particle diameter [μm] | Y: Specific surface area [m²/g] | X × Y | Filler/ PVdF | Resin material | Pore size of base material layer [nm] | Contact angle [degree] | Pore size of surface layer [nm] | Capacity retention rate [%] |
| Example 1 | Aluminum oxide | 0.20 | 13.0 | 2.60 | 20/1 | Polyethylene | 17.9 | 4.9 | 33.6 | 96 |
| Example 2 | | 0.40 | 5.2 | 2.08 | | | | 5.8 | 38.9 | 97 |
| Example 3 | | 0.80 | 18.2 | 14.56 | | | | 6.3 | 48.9 | 95 |
| Example 4 | | 1.20 | 14.2 | 17.04 | | | | 8.8 | 75.5 | 93 |
| Example 5 | | 0.42 | 15.0 | 6.30 | | | | 7.4 | 38.8 | 97 |
| Example 6 | | 0.30 | 7.0 | 2.10 | | | | 5.4 | 43.5 | 87 |
| Example 7 | | 0.80 | 10.0 | 7.98 | | | | 9.6 | 38.7 | 92 |
| Example 8 | | 0.30 | 15.3 | 4.60 | | | | 5.6 | 50.7 | 79 |
| Example 9 | | 1.20 | 12.3 | 14.72 | | | | 7.6 | 53.9 | 82 |
| Example 10 | | 0.30 | 59.8 | 17.94 | | | | 6.5 | 36.2 | 80 |
| Comparative Example 1 | Aluminum oxide | 0.09 | 1.8 | 0.16 | 20/1 | Polyethylene | 17.9 | 11.8 | 28.9 | 43 |
| Comparative Example 2 | | 0.30 | 3.0 | 0.90 | | | | 8.6 | 32.9 | 63 |
| Comparative Example 3 | | 0.50 | 1.5 | 0.75 | | | | 7.8 | 42.3 | 57 |
| Comparative Example 4 | | 0.10 | 5.0 | 0.50 | | | | 6.9 | 34.6 | 48 |
| Comparative Example 5 | | 0.30 | 63.8 | 19.15 | | | | 11.2 | 45.3 | 52 |
| Comparative Example 6 | | 0.12 | 150.3 | 18.04 | | | | Measurement impossible | Measurement impossible | Measurement impossible |
| Comparative Example 7 | | 1.40 | 14.7 | 20.58 | | | | Measurement impossible | Measurement impossible | Measurement impossible |
| Comparative Example 8 | | 8.0 | 2.3 | 18.40 | | | | Measurement impossible | Measurement impossible | Measurement impossible |
| Comparative Example 9 | | 30.00 | 0.7 | 21.00 | | | | Measurement impossible | Measurement impossible | Measurement impossible |
| Comparative Example 10 | | 26.00 | 0.7 | 18.20 | | | | Measurement impossible | Measurement impossible | Measurement impossible |
| Comparative Example 11 | | No | No | No | | | | 35 | No | 68 |

In order that the structure of the functional resin layer may have a porous interconnected structure, it may be required to regulate a concentration of a resin in a resin solution to be coated on a polyethylene microporous film at an adequate concentration.

The resin solution is one obtained by dispersing an inorganic oxide filler and a resin material in N-methyl-2-pyrrolidone as a solvent. When the concentration of each of the inorganic oxide filler and the resin material in the solvent is too high, in a state after the resin solution is coated on the polyethylene microporous film, voids by N-methyl-2-pyrrolidone to be replaced by a poor solvent are disposed in a spherical droplet structure. For that reason, when the resin solution is put in a water bath to achieve phase separation, followed by drying, the voids are independently formed, and As noted from Table 1, in the case where the product X×Y of the mean particle diameter (X) and the specific surface area (Y) is 1 or more and not more than 18, a high capacity retention rate could be obtained. Also, even if the product X×Y of the mean particle diameter (X) and the specific surface area (Y) falls within the foregoing range, in the case where each of the mean particle diameter and the specific surface area falls outside the optimal range, it was noted that a lowering of the battery characteristics is caused, or the fabrication of the separator is difficult.

In each of the Examples using aluminum oxide having a mean particle diameter of 0.2 μm or more and not more than 5.0 μm and a specific surface area of 2.0 m²/g or more and having the product X×Y of the mean particle diameter (X) and the specific surface area (Y) of 1 or more and not more than 18, the contact between the separator and the solution was small. That is, it may be considered that in the separator according to the first embodiment, the electrolytic solution is easy to sink into the separator at the time of fabricating a battery; and that the liquid-holding properties of the electrolytic solution are high. Also, a high capacity retention rate as 79% or more was revealed.

On the other hand, in Comparative Example 1 using aluminum oxide in which both the mean particle diameter and the specific surface area are small, and the value of X×Y falls outside the specified range, the capacity retention rate was conspicuously lowered to 43%. As noted from the fact that the contact angle against the separator is large as 11.8, it may be considered that this was caused due to the fact that the liquid-holding properties of the separator was low, so that the battery reactivity was lowered. Also, it may be considered that this was caused due to the fact that aluminum oxide having a small particle size was easy to come into the pores of the base material layer, so that the ion permeability was lowered. Similar to Comparative Example 1, in Comparative Example 4, since the mean particle diameter of aluminum oxide is small, it may be considered that this was caused due to the fact that the pores of the base material layer were easily clogged by aluminum oxide, so that the ion permeability was lowered.

Also, in Comparative Example 2 in which though each of the mean particle diameter and the specific surface area falls within the specified range, the value of X×Y is too small as 0.9 and Comparative Example 3 in which though either one of the mean particle diameter or the specific surface area falls within the specified range, the value of X×Y falls outside the specified range, though the capacity retention rate was higher than that of Comparative Examples 1 and 4, it was still low.

Also, in Comparative Example 5, though the mean particle diameter falls within the specified range, the specific surface area was remarkably large, so that the capacity retention rate was lowered.

On the other hand, in Comparative Example 6, since the mean particle diameter is very small, and though the specific surface area falls within the specified range, it is very large, the viscosity of the resin solution increased, and the resin solution could not be coated on the polyethylene microporous film, so that the surface layer could not be formed.

In Comparative Example 7, though both the mean particle diameter and the specific surface area fall within the optimal ranges, many aggregates resulting from aggregation of aluminum oxide in the resin solution were formed. For that reason, the resin solution could not be coated on the polyethylene microporous film, so that the surface layer could not be formed.

In Comparative Example 8 in which the mean particle diameter is large, a region where the resin solution was not coated due to the presence of aluminum oxide was formed. Also, coating per se of the resin solution was difficult.

Also, even in Comparative Examples 9 and 10, since the mean particle diameter of aluminum oxide is too large, coating of the resin solution was difficult.

In Comparative Example 11 in which the surface layer was not provided, the capacity retention rate was low as 68% as compared with the capacity retention rate of the separator having a surface layer provided thereon according to the first embodiment. It may be considered that this was caused due to the fact that since the surface layer was not provided, the liquid-holding properties of the separator and the impregnating properties of the electrolytic solution relative to the separator were poor.

From the foregoing results, by forming a layer having a mutual continuous phase structure on the separator surface and containing an inorganic oxide filler and regulating a mean particle diameter, a specific surface area and a value of the product of the mean particle diameter and the specific surface area of the inorganic oxide filler to optimal ranges, a nonaqueous electrolyte battery capable of realizing a high capacity retention rate could be obtained.

While the present embodiments have been described with respect to a lithium ion secondary battery as an example, it can also be applied to, for example, a nickel-hydrogen battery, a nickel-cadmium battery, a lithium-manganese dioxide battery, a lithium-iron sulfide battery and the like.

Also, in the foregoing embodiments and Examples, though a so-called lithium ion secondary battery in which the capacity of the negative electrode is expressed by a capacity component due to the intercalation and deintercalation of lithium has been described, the embodiments can also be applied to a so-called lithium metal secondary battery in which a lithium metal is used as a negative electrode active material, and the capacity of the negative electrode is expressed by a capacity component due to the deposition and dissolution of lithium, or a secondary battery constructed in such a manner that by making a charge capacity of a negative electrode material capable of intercalating and deintercalating lithium smaller than a charge capacity of a positive electrode, the capacity of the negative electrode includes a capacity component due to the intercalation and deintercalation of lithium and a capacity component due to the deposition and dissolution of lithium and is expressed by a total sum of them.

Furthermore, in the foregoing embodiments, though the nonaqueous electrolyte secondary battery having a winding structure has been described, the present embodiments can also be applied to batteries having a structure in which, for example, a positive electrode and a negative electrode are folded or piled. Moreover, the present embodiments are not limited with respect to the shape of the battery but can also be applied to rectangular batteries and the like. In addition, the present embodiments are not limited to the secondary battery but can also be applied to a primary battery.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A separator comprising:
    a base material layer; and
    a functional resin layer containing a resin material including polytetrafluoroethylene and a filler, having a porous interconnected structure in which a plurality of pores are mutually interconnected and having a contact angle against an electrolytic solution of not more than 11 degrees,
    wherein the filler includes at least one of aluminum nitride (AlN) and boron nitride (BN),
    wherein the base material layer is composed of a microporous film made of a polyolefin resin different from the resin material contained in the functional resin layer,
    wherein a diameter of a narrowest portion of through-holes of the functional resin layer is larger than a diameter of a narrowest portion of through-holes of the base material layer, and wherein an average pore size of the base material layer is less then a mean particle diameter of the filler.

2. The separator according to claim 1, wherein a mean particle diameter of the filler is not more than 50% of a thickness of the functional resin layer.

3. The separator according to claim 2, wherein the filler has a mean particle diameter of 0.2 μm or more and not more than 5.0 μm and has a specific surface area of 2.0 m$^2$/g or more; and when the mean particle diameter and the specific surface area of the filler are defined as X [μm] and Y [m$^2$/g], respectively, a value obtained by multiplying X by Y falls within the range of $1 \leq (X \times Y) \leq 18$.

4. The separator according to claim 3, wherein the functional resin layer contains at least a heat-resistant resin.

5. A nonaqueous electrolyte battery comprising:
a positive electrode;
a negative electrode;
an electrolyte; and
a separator, wherein
the separator is composed of a base material layer, and a functional resin layer containing a resin material including polytetrafluoroethylene and a filler, having a porous interconnected structure in which a plurality of pores are mutually interconnected and having a contact angle against an electrolytic solution of not more than 11 degrees,
wherein the filler includes at least one of aluminum nitride (AlN) and boron nitride (BN),
wherein the base material layer is composed of a microporous film made of a polyolefin resin different from the resin material contained in the functional resin layer,
wherein a diameter of a narrowest portion of through-holes of the functional resin layer is larger than a diameter of a narrowest portion of through-holes of the base material layer, and
wherein an average pore size of the base material layer is less then a mean particle diameter of the filler.

6. The nonaqueous electrolyte battery according to claim 5, wherein
a mean particle size of the filler is not more than 50% of a thickness of the functional resin layer.

7. The nonaqueous electrolyte battery according to claim 6, wherein
the filler has a mean particle diameter of 0.2 μm or more and not more than 5.0 μm and a has specific surface area of 2.0 m$^2$/g or more; and
when the mean particle diameter and the specific surface area of the filler are defined as X [μm] and Y [m$^2$/g], respectively, a value obtained by multiplying X by Y falls within the range of $1 \leq (X \times Y) \leq 18$.

8. The nonaqueous electrolyte battery according to claim 1, wherein
an open circuit voltage in a full charge state is 4.2 V or more and not more than 4.6 V.

9. The separator according to claim 1, wherein the functional resin layer has a contact angle against an electrolytic solution of not more than 5.8 degrees.

10. The separator according to claim 9, wherein the filler has a mean particle diameter of 0.20 μm or more and not more than 0.40 μm and has a specific surface area of 2.0 m$^2$/g or more.

* * * * *